United States Patent
Inoue et al.

(10) Patent No.: US 8,609,200 B2
(45) Date of Patent: Dec. 17, 2013

(54) HOSE WITH SEALING LAYER, DIRECT-CONNECT ASSEMBLY INCLUDING THE SAME AND METHOD OF MANUFACTURING THE SAME

(75) Inventors: Tomoki Inoue, Konan (JP); Kazutaka Katayama, Kasugai (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 692 days.

(21) Appl. No.: 12/418,711

(22) Filed: Apr. 6, 2009

(65) Prior Publication Data

US 2009/0197016 A1 Aug. 6, 2009

Related U.S. Application Data

(62) Division of application No. 11/237,603, filed on Sep. 27, 2005, now abandoned.

(30) Foreign Application Priority Data

Sep. 28, 2004 (JP) .................................. 2004-281275

(51) Int. Cl.
*H05H 1/24* (2006.01)
*B05D 3/06* (2006.01)
*B05D 3/12* (2006.01)
*H05H 1/46* (2006.01)

(52) U.S. Cl.
USPC ...... 427/536; 427/358; 427/539; 156/244.13; 156/244.17; 118/723 ER

(58) Field of Classification Search
None
See application file for complete search history.

(56) References Cited

U.S. PATENT DOCUMENTS

| 4,216,254 | A | * | 8/1980 | Lundell et al. ................ 428/35.5 |
| 4,320,716 | A | * | 3/1982 | Boulanger et al. ..... 118/723 ME |
| 4,907,625 | A |  | 3/1990 | Ito et al. |
| 5,232,791 | A | * | 8/1993 | Kohler et al. .............. 428/835.2 |
| 5,318,806 | A | * | 6/1994 | Montgomery et al. ........ 427/491 |
| 5,328,516 | A | * | 7/1994 | Dietiker ................ 118/723 DC |
| 5,374,314 | A | * | 12/1994 | Babacz .................. 118/723 MP |
| 5,378,510 | A | * | 1/1995 | Thomas et al. ................ 427/563 |
| 5,472,746 | A | * | 12/1995 | Miyajima et al. ............. 427/468 |
| 5,500,257 | A | * | 3/1996 | Krause et al. ................. 427/487 |
| 5,677,010 | A | * | 10/1997 | Esser et al. .................... 427/489 |
| 5,957,163 | A |  | 9/1999 | Ito et al. |

(Continued)

FOREIGN PATENT DOCUMENTS

| CN | 1115568 | 1/1996 |
| JP | 56-167733 A * | 12/1981 .................... 427/536 |

(Continued)

OTHER PUBLICATIONS

Machine translation of JP 09-144955 A, by Ito et al., published Jun. 1997.*

(Continued)

*Primary Examiner* — Marianne L Padgett
(74) *Attorney, Agent, or Firm* — Greenblum & Bernstein, P.L.C.

(57) ABSTRACT

In a hose having a resin layer as an inner layer, a plasma treatment is performed on the inner surface of the inner layer and a connecting portion of an end part of the hose to thereby perform surface modification. Then, a sealing layer made of an elastic material is coated on and bonded to the inner surface of the connecting portion.

16 Claims, 13 Drawing Sheets

(56) References Cited

U.S. PATENT DOCUMENTS

| | | | |
|---|---|---|---|
| 6,001,429 A * | 12/1999 | Martin | 427/536 |
| 6,129,856 A * | 10/2000 | Jung et al. | 216/63 |
| 6,242,053 B1 * | 6/2001 | Anderle et al. | 427/488 |
| 6,346,301 B2 * | 2/2002 | Beele et al. | 427/561 |
| 6,350,961 B1 * | 2/2002 | Jung | 219/121.59 |
| 6,602,565 B1 | 8/2003 | Katayama et al. | |
| 6,609,729 B2 | 8/2003 | Nishiyama et al. | |
| 6,655,414 B2 | 12/2003 | Nishi et al. | |
| 6,854,309 B2 * | 2/2005 | Shimada | 72/46 |
| 6,923,218 B2 | 8/2005 | Kumagai et al. | |
| 6,958,097 B2 * | 10/2005 | Luttringhaus-Henkel et al. | 118/503 |
| 7,214,413 B2 * | 5/2007 | Koulik et al. | 427/562 |
| 7,231,941 B2 | 6/2007 | Sakazaki et al. | |
| 7,444,955 B2 * | 11/2008 | Boardman et al. | 118/723 E |
| 8,039,061 B2 * | 10/2011 | Takimoto | 427/536 |
| 8,210,213 B2 * | 7/2012 | Miyamoto et al. | 138/137 |
| 2003/0098085 A1 * | 5/2003 | Ito et al. | 138/137 |
| 2003/0099799 A1 | 5/2003 | Koike et al. | |
| 2003/0118765 A1 | 6/2003 | Govaerts et al. | |
| 2003/0217527 A1 * | 11/2003 | Luttringhaus-Henkel et al. | 53/79 |
| 2005/0208248 A1 | 9/2005 | Ilo et al. | |
| 2007/0194481 A1 * | 8/2007 | Iio et al. | 264/171.27 |

FOREIGN PATENT DOCUMENTS

| | | | |
|---|---|---|---|
| JP | 62-143939 A * | 6/1987 | 427/536 |
| JP | 62-195028 A * | 8/1987 | 427/539 |
| JP | 3-275137 | 12/1991 | |
| JP | 6-255004 | 9/1994 | |
| JP | 8-270875 A | 10/1996 | |
| JP | 9-100959 | 4/1997 | |
| JP | 9-144955 A | 6/1997 | |

OTHER PUBLICATIONS

Machine translations of CN 1115568 A, by Kato Kazuhiro et al., published Jan. 1996.*

Japan Office action, mail date is Oct. 18, 2010 along with an English translation thereof.

* cited by examiner

FIG. 4
(V)
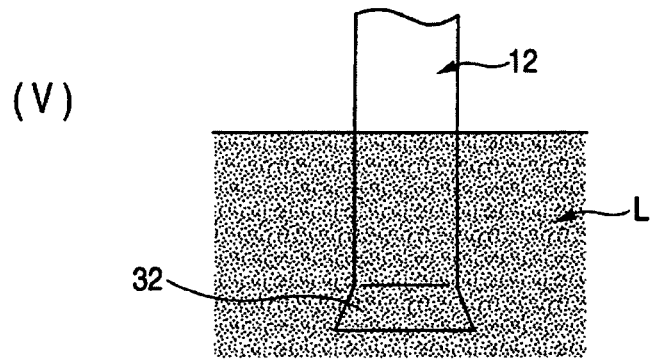
(VI)
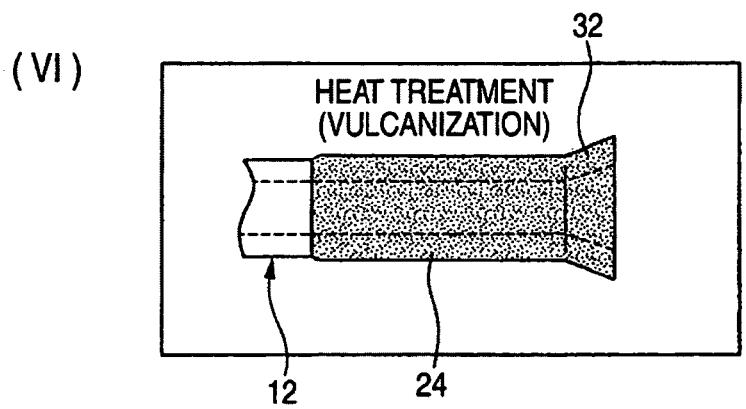
(VII)
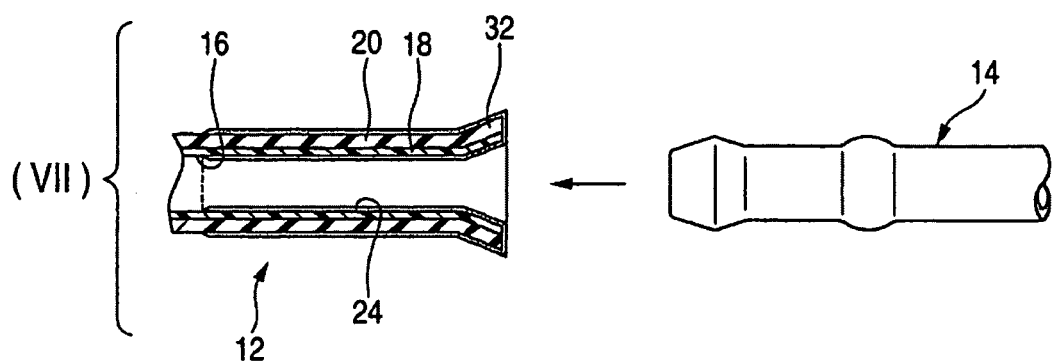

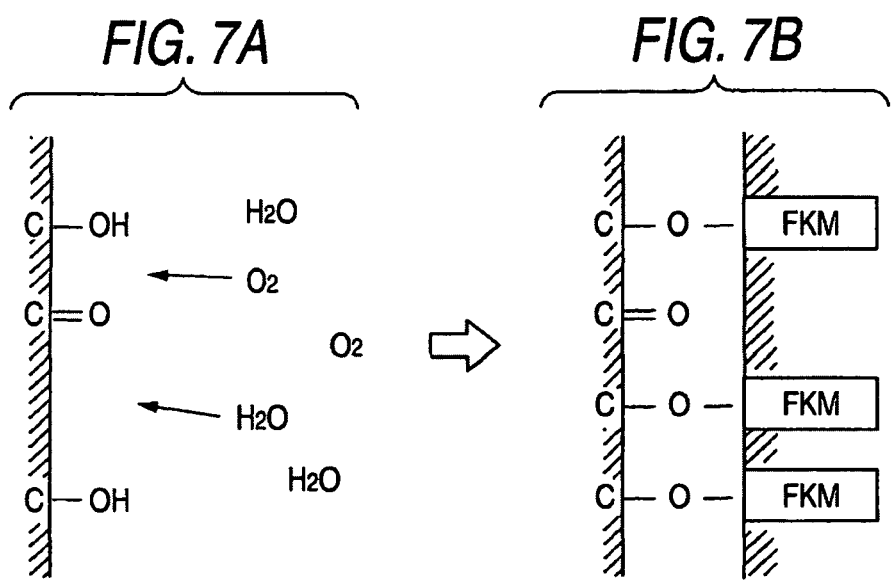

HOSE WITH SEALING LAYER, DIRECT-CONNECT ASSEMBLY INCLUDING THE SAME AND METHOD OF MANUFACTURING THE SAME

CROSS-REFERENCE TO RELATED APPLICATIONS

This is a divisional of U.S. patent application Ser. No. 11/237,603, filed Sep. 27, 2005 which claims the benefit of Japanese Patent Application No. 2004-281275, filed Sep. 28, 2004, the disclosure of which is incorporated herein in its entirety by reference.

BACKGROUND OF THE INVENTION

1. Field of the Invention

The present invention relates to a hose having a resin layer as an inner layer and is suited for transporting hydrocarbon, such as gasoline, light oil, compressed natural gas, liquefied petroleum gas, and for transporting hydrogen, dimethyl ether, alcohol, warm water, and air-conditioning refrigerant. More particularly, the invention relates to a hose having a sealing layer, which is made of an elastic material, on the inner surface of a connecting portion at an end part thereof, to a direct-connect assembly formed by connecting this hose to a metal pipe, and to a method of manufacturing this hose.

2. Description of the Related Art

Hitherto, hoses each having a resin layer as an innermost layer have been used for piping of vehicles.

For example, a hose having a fluororesin layer as an innermost layer has been used as a hose for transporting an automotive fuel.

The gasoline permeability resistance of the hose for transporting fuel can be enhanced by providing the fluororesin layer as an innermost layer therein.

In a case where such a hose is connected to a counterpart metal pipe, a resin joint, which is what is called a quick connector, has hitherto been used.

For example, JP-A-8-270875 discloses a hose connecting structure using this joint.

FIG. 11 specifically shows this hose connecting structure. Herein, a resin joint 202 is preliminarily attached to an end part of a hose 200. Then, a counterpart metal pipe 204 is inserted thereto thereby to connect the hose 200 to the metal pipe 204 through the joint 202 so that the metal pipe 204 is prevented from slipping off the hose 200. O-rings 206 mounted in the joint 202 seal therebetween.

However, in a case where the hose 200 and the metal pipe 204 are connected to each other by using such a resin joint 202, there is a fear that the joint 202 hits against other components and gets crashed at automobile collision accidents. Thus, it has been studied that the metal pipe and the hose are directly connected to each other without using the joint 202.

This technique has an advantage in that the number of steps of an assembling process performed on an automotive assembly line can be reduced by one by preliminarily connecting the metal pipe directly to the hose to form a direct-connect assembly, in which the metal pipe and the hose are integral with each other, and then by assembling this direct-connect assembly to another component on the automotive assembly line. Also, this technique has another advantage that the number of components needed for assembly of an automobile can be reduced.

However, generally, the innermost layer of the hose, which layer is constituted by a resin layer, is poor in elasticity. Therefore, in a case where the metal pipe is connected to the hose by being press-fitted into the hose, it is difficult to ensure the sealability of the connecting portion.

Thus, it has been considered as a means for ensuring the sealability that sealing O-rings made of an elastic material are preliminarily mounted on the outer surface of the metal pipe, and that in this state, the metal pipe is connected to and press-fitted into the hose to thereby simultaneously seal between the metal pipe and the hose.

However, this sealing technique using the O-rings has encountered the problems that when the metal pipe is press-fitted into the hose, the O-rings may get out of position and that when an oscillating force is applied to the metal pipe and the hose, the O-rings may rotate in the connecting portion.

Thus, it has been considered as countermeasures that a sealing layer made of an elastic material is coated on and is bonded to the connecting portion between the metal pipe and the hose to thereby seal the connecting portion using the sealing layer.

At that time, there are two cases. In one of the cases, the sealing layer is coated on and is bonded to the outer surface of the metal pipe. In the other case, the sealing layer is coated on and is bonded to the inner surface of the hose, more specifically, the inner surface of the connecting portion at an end thereof.

However, in the case of a metal pipe used for piping of vehicles, the length of a long one of such a metal pipe is about 5 m. Therefore, it is difficult to actually form a sealing layer made of an elastic material on the outer surface of such a long metal pipe. Thus, it is advantageous to preliminarily form the sealing layer made of an elastic material on the inner surface of an end part of the hose.

The technique of forming the sealing layer made of an elastic material on the inner surface of an end part of the hose is disclosed in JP-A-9-144955.

Meanwhile, it is necessary for the hose having a resin layer as an innermost layer that the material of such a resin layer has high chemical resistance, such as low permeability of transported fluid so as to deal with various kinds of fluids.

However, such a high chemical resistance material is chemically inactive and is poor in adhesiveness. Therefore, this related technique has a problem that in a case where the sealing layer is simply formed by coating the elastic material of the sealing layer on the inner surface, the sealing layer is peeled when the metal pipe is press-fitted into the hose.

SUMMARY OF THE INVENTION

To solve this problem, the inventors of the invention tried to perform surface modification by conducting a corona treatment on the innermost layer before the coating of the innermost layer with the sealing layer, to thereby enhance the adhesive strength thereof.

The corona treatment is known as means for imparting the adhesive strength to a surface of a high-polymer material. The inventors of the invention tried to apply the corona treatment as means for imparting the adhesive strength to the inner surface of the hose, more specifically, the innermost layer constituted by a resin layer.

However, a good result was not obtained.

FIGS. 12, 13A and 13B more specifically illustrate the method using the corona treatment, which has been actually studied by the inventors of the invention.

First, an end of a (resin) hose 210 having an innermost layer 208 constituted by a resin layer is expansion-deformed. Thus, a horn-like flare part 214 is formed in a connecting portion 212 (see steps (I) and (II) shown in FIG. 12).

Incidentally, the horn-like flare part 214 is formed so as to enhance the press-fitting ability when the metal pipe is press-fitted into the hose in a later step.

Subsequently, as also shown in FIG. 13A, an electrode 216 is inserted into the inside and is set at the central portion of the hose 210 having the flare part 214. Then, the hose 210, more specifically, an innermost layer 208 is used as another electrode. Further, a sinusoidal voltage shown in FIG. 13B is applied between the innermost layer 208 and the electrode 216 to thereby cause a corona discharge therebetween. The inner surface of the innermost layer 208 is modified by the corona discharge (see step (III) shown in FIG. 12).

Subsequently, the sealing layer 218 made of an elastic material is coated on and is bonded to the inner surface of the hose 210 over the entire length of the connecting portion 212.

Incidentally, a rubber elastic material is used as the material of the sealing layer 218. Also, the technique of dipping the hose 210 into liquid is employed as the coating technique. Thus, the sealing layer 218 is formed on not only the inner surface but the outer surface of the hose 210 (see step (IV) shown in FIG. 12).

Also, vulcanization is performed after the dipping of the hose 12. Thus, the sealing layer 218 is formed on and is bonded to the inner surface of the innermost layer 208.

However, in this corona treatment, since infinitely many fine irregularities are present on the entire inner surface of the innermost layer 208 of the hose 210, which is used as one of the electrodes, and it is difficult to maintain the distance between the electrode 216 and the inner surface of the hose 210 at a constant value, it is difficult to control the voltage developed between a pair of the electrodes. When the voltage reached a lightening discharge region (or a spark region) S shown in FIG. 13B, a spark is generated.

Thus, when such a spark is generated, the innermost layer 208 is partly melted. Sometimes, holes are formed in the innermost layer 208.

Also, the distance between the horn-like flare part 214 and the electrode 216 is differed from that between the electrode 216 and the other straight-shaped portions. Thus, the method using the corona treatment has encountered the problems that the corona treatment cannot favorably be performed on the inner surface of the flare part 214, more specifically, the inner surface of the innermost layer 208 of the flare part 214, and that consequently, the adhesive strength of the sealing layer 218 is extremely low at the flare part 214.

It has been considered as a method of avoiding an occurrence of such a problem that before the flare part 214 is formed, the corona treatment is performed on a straight-tube-like hose 210, and that subsequently, an end of the hose 210 is enlarged to thereby form the horn-like flare part 214. However, this method has problems in that the (inner) surface of the innermost layer 208, which is modified by the corona treatment, is subjected to flare processing later to thereby impair the effects of the surface modification, for example, break down the texture of the modified part, and that consequently, the adhesive strength between the inner surface of the flare portion 214 and the sealing layer 218 is reduced, whereby the sealing layer is peeled at the flare part 214 when the metal pipe 204 is press-fitted into the hose (see step (V) shown in FIG. 12).

The invention is accomplished in view of the aforementioned circumstances. Accordingly, an object of the invention is to provide a hose with a sealing layer, which is configured so that a resin inner layer and a resin sealing layer are bonded to each other at sufficient adhesive strength and that the sealing layer is not peeled when a counterpart metal pipe is press-fitted thereto. The invention also provides a direct-connect assembly formed by connecting this hose to a metal pipe, and a method of manufacturing this hose.

According to an aspect of the invention, there is provided a hose with a sealing layer, including: a connecting portion on one end part of the hose; a resin layer as an inner layer of the hose; and a sealing layer made of an elastic material; wherein a functional group including oxygen is formed in the resin layer of the connecting portion, and the sealing layer is coated on and bonded to an inner surface of the resin layer.

The resin layer may be made of a melt formable resin.

Also, the resin layer may be made of a fluororesin.

Further, the resin layer may include one selected from the group consisting of ethylene-tetrafluoroethylene copolymer, thermoplastic polyester elastomer, polybutylene terephthalate, polyphenylenesulfide, polyethylene, and polypropylene.

Incidentally, the hose may be used in a vehicle.

Further, an atmospheric plasma treatment may be performed on the resin layer to form therein the functional group including oxygen.

The hose may further include a flare part expanded like a horn and provided at an end of the connecting portion; wherein the flare part and straight-shaped other portions of the connecting portion are substantially uniformly modified; and adhesive strength between the sealing layer and each of the flare part and the straight-shaped other portions is set at substantially equal strength.

According to another aspect of the invention, there is provided a direct-connect assembly including: a metal pipe; and a hose with a sealing layer including: a connecting portion on one end part of the hose; a resin layer as an inner layer of the hose; and a sealing layer made of an elastic material; wherein a functional group including oxygen is formed in the resin layer of the connecting portion, and the sealing layer is coated on and bonded to an inner surface of the resin layer; and an end part of the metal pipe is press-fitted into the connecting portion and the metal pipe is directly connected to the hose.

According to still another aspect of the invention, there is provided a method of manufacturing a hose with a sealing layer, the hose including a connecting portion on one end part thereof, a resin layer as an inner layer of the hose and a sealing layer made of an elastic material, the method including: sending a plasma gas generated by glow discharge between a pair of electrodes to an inner surface of the inner layer of the connecting portion to thereby modify the inner surface by action of the plasma gas; and coating the sealing layer on the inner surface to bond the sealing layer to the inner surface.

Additionally, an abutting die may be used, against which an end part of the hose abuts, the abutting die having an insertion space into which the end part of the hose is inserted, a gas introducing space extending from the insertion space and penetrating through the abutting die in a direction opposite to the insertion space, and a blocking portion operative to block the plasma gas introduced through the gas introducing space from going around to an outer surface of the hose; and the plasma gas is introduced to the inner surface of the inner layer of the connecting portion through the gas introducing space to thereby modify the inner surface by action of the plasma gas.

Also, an abutting die may be used, against which an end part of the hose having a flare part abuts, the abutting die having an insertion space into which the end part of the hose is inserted, a gas introducing space extending from the insertion space and penetrating through the abutting die in a direction opposite to the insertion space, a blocking portion operative to block the plasma gas introduced through the gas introducing space from going around to an outer surface of the hose, and a guide portion operative to lead the plasma gas to an end of the flare part; the plasma gas is introduced to the inner surface of the inner layer of the connecting portion through the gas introducing space to thereby modify the inner surface by action of the plasma gas; and the guide portion causes the plasma gas to flow from the end of the flare part to an inside of the inner layer.

As described above, the hose of the invention is adapted so that after the plasma treatment is performed on the inner surface of the inner layer to thereby modify the inner surface, the sealing layer made of an elastic material is coated thereon and is bonded thereto.

Incidentally, in the plasma treatment, glow discharge is caused between a pair of electrodes (however, the hose is not used as the electrode) by applying a low voltage therebetween to thereby generate a plasma gas that is made to act upon the inner surface of the hose, more specifically, the inner surface of the inner layer constituted by a resin layer of the connecting portion, to thereby modify the inner surface.

When glow discharge is caused by applying a low voltage between the pair of electrodes, molecules of a gas between the electrodes are dissociated by the impact of electrons into ions, electrons, radicals, atoms, and molecules. Thus, a plasma gas including various kinds of chemical species is generated.

When such a plasma gas is made to act upon the inner layer constituted by the resin layer, organic bonds in the inner layer are broken down. Instead, functional groups including oxygen are formed therein. More specifically, a carbonyl group and a hydroxyl group, which include oxygen, and the like are formed. Also, fine irregularities are formed on the inner surface of the inner layer by the etching effect.

Then, when the sealing layer made of the elastic material is coated on the inner surface of the inner layer, the sealing layer is bonded to the inner layer at strong adhesive strength.

Therefore, when the metal pipe is press-fitted into and is connected to the end part of the hose, onto the inner surface of which such a sealing layer is coated and is bonded, the sealing layer can favorably be prevented from peeling off. Consequently, the reliability of the connection between the hose and the metal pipe can be enhanced.

According to the invention, a melt formable resin can be used as the resin constituting the inner layer.

An extrusion molding method, a blow molding method, an injection molding method, a rotational molding method, a thermal spraying method, and a powder coating method may be used as a melt forming method.

According to these methods, the hose, which includes pipings, such as a tube and a pipe, can be formed in a single-layer structure or in a multi-layer structure.

According to the invention, a fluororesin, which extremely excels in chemical resistance, can preferably be used as the resin constituting the inner layer.

Meanwhile, such a fluororesin is chemically inactive and is poor in adhesiveness. Thus, the invention is applied to a hose, which has a layer made of such a fluororesin as the inner layer, and is very effective.

Incidentally, examples of the fluororesin constituting the inner layer are an ethylene-tetrafluoroethylene copolymer (ETFE), polyvinylidene fluoride (PVDF), polyvinyl fluoride (PVF), polychlorotrifluoroethylene (CTFE), ethylene-chlorotrifluoroethylene copolymer (ECTFE), an ethylene-tetrafluoroethylene-hexafluoropropylene copolymer, a tetrafluoroethylene-hexafluoropropylene copolymer (FEP), polytetrafluoroethylene (PTFE), a tetrafluoroethylene-perfluoroalkylvinyl ether copolymer (PFA), a tetrafluoroethylene-hexafluoropropylene-perfluoroalkoxyethylene terpolymer, a vinylidene-fluoride-tetrafluoroethylene copolymer, a vinylidene fluoride-hexafluoropropylene copolymer, a tetrafluoroethylene-hexafluoropropylene-vinylidene-fluoride terpolymer (THV), a hexafluoropropylene-perfluoroalkylvinyl ether copolymer, a vinylidene fluoride-perfluoroalkylvinyl ether copolymer, a vinylidene fluoride-chlorotrifluoroethylene copolymer, a vinylidene fluoride-tetrafluoroethylene-perfluoroalkylvinyl ether copolymer, a vinylidene fluoride-hexafluoropropylene-perfluoroalkylvinyl ether copolymer, a ethylene-tetrafluoroethylene-perfluoroalkylvinyl ether copolymer, an ethylene-hexafluoropropylene-perfluoroalkylvinyl ether copolymer, and an ethylene-tetrafluoroethylene-hexafluoropropylene-perfluoroalkylvinyl ether copolymer. Especially, ETFE is preferable due to formability of a tube.

On the other hand, various materials, such as NBR, butyl rubber, halogenated butyl rubber, acryl, EPDM, EPM, a thermoplastic elastomer, and an elastic coating, may be used as the elastic material of the sealing layer according to properties needed by the internal fluid.

Among these materials, fluorocarbon rubber elastic materials excel in heat resistance and chemical resistance and is especially preferable.

The elastic material of the sealing layer may be made to be electrically conductive.

According to the invention, one selected from the group constituting of ETFE, TPEE (Thermoplastic Polyester Elastomer), PBT (polybutylene terephthalate), PPS (polyphenylenesulfide), PE (polyethylene), and PP (polypropylene) can preferably be used as the main ingredient of the resin of the inner layer.

Alloy materials, which have these resins as the main ingredient and are improved in electrical conductivity, flexibility, and impact resistance, may be used as the material of the inner layer.

Also, the invention can preferably be applied to hoses used in vehicles.

According to the invention, an atmospheric plasma treatment can be applied as the aforementioned plasma treatment. The atmospheric plasma treatment is preferable than the vacuum plasma treatment because it does not require batch processing for making it vacuum. Also, in the atmospheric plasma treatment, plasticizing material such as oil does not adhere to the surface of the hose. In the case of the vacuum plasma treatment, on the other hand, oil oozed by releasing the vacuum state adhere to the surface of the hose.

Next, according to the hose of the invention, which has a flare part expanded like a horn provided at an end of the connecting portion thereof, the flare part and each of straight-shaped other portions of the connecting portion are substantially uniformly modified. The adhesive strength between the sealing layer and each of the flare part and the straight-shaped other portions is set at substantially equal strength.

According to this hose with the sealing layer, the inner layer is adapted so that the adhesive strength between the sealing layer and each of the flare part and the straight-shaped other portions is set at substantially equal strength. Thus, when the metal pipe is press-fitted into the hose, not only the straight-shaped portions but the flare part, against which the bulged portion abuts in an initial stage of the press-fitting, does not peel off.

Next, according to the direct-connect assembly of the invention, including a hose and a metal pipe, an end part of the metal pipe is press-fitted into the inside of the connecting portion of the hose. Also, the metal pipe is directly connected to the hose in a state in which the metal pipe is fitted into the hose. Thus, in a case where the hose and the metal pipe are preliminarily formed in a state in which the metal pipe is directly fitted into the hose, the step of assembling the metal pipe to the hose in an assembling process performed on an automotive assembly line can be omitted. Consequently, the number of steps of the assembling process can be reduced. Also, the number of components needed for assembly of an automobile can be reduced.

According to the manufacturing method of the invention, a plasma gas generated by glow discharge between a pair of electrodes is sent to the inner surface of the inner layer of the connecting portion of the hose to thereby modify the inner surface by the action of the plasma gas. Subsequently, the elastic material is coated on the inner surface thereby to form the sealing layer and to bond the sealing layer to the inner surface. Consequently, after the inner surface of the inner layer is modified, the sealing layer can easily be formed. Also, the adhesive strength between the sealing layer and the inner surface of the inner layer can be enhanced to high strength.

The manufacturing method of the invention preferably uses the abutting die at that time. An end part of the hose is inserted into the insertion space of the abutting die and abuts thereagainst. Also, the plasma gas introduced to the inner surface of each of the connecting portion of the hose and the innermost layer through the gas introducing space is made to act upon the inner surface of the hose to thereby modify the inner surface. Consequently, the plasma gas can be made to easily and efficiently act only upon the inner surface of the hose to thereby achieve the surface modification.

Additionally, according to the manufacturing method of the invention, the guide portion operative to lead the plasma gas to an end of the flare part is provided in the abutting die. Thus, the plasma gas is made to flow from the end of the flare portion into the inside of the inner layer. Thus, regardless of the fact that the hose has the flare part at an end thereof, the plasma gas can be made to uniformly act upon the inner surface of the flare part and upon the inner surface of each of straight-shaped other portions. Thus, the inner surfaces thereof are substantially uniformly surface-modified.

Consequently, the adhesive strength between the sealing layer and each of the flare part and the straight-shaped other portions can be set at high and equal strength.

BRIEF DESCRIPTION OF THE DRAWINGS

FIG. 4 (V-VII) is a view illustrating steps subsequent to the step of the method illustrated in FIG. 3;

FIGS. 7A and 7B are explanatory views illustrating surface modification performed by a plasma treatment;

DETAILED DESCRIPTION OF THE PREFERRED EMBODIMENT

Next, an embodiment of the invention is described in detail with reference to the accompanying drawings.

Figure 1A:
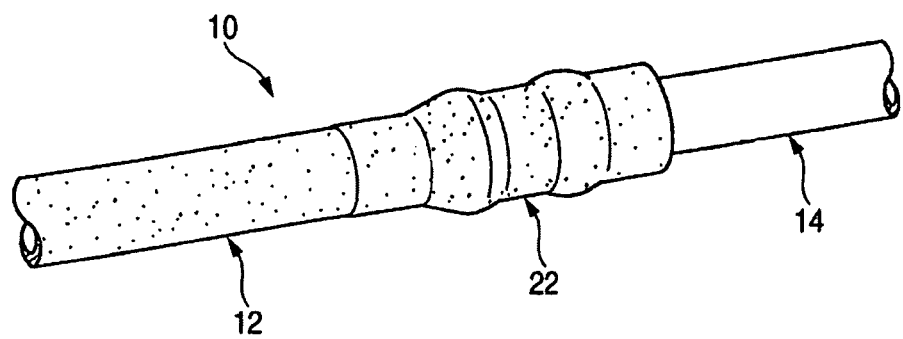
FIGS. 1A and 1B are views illustrating a direct-connect assembly according to an embodiment of the invention, together with a connecting portion.
Figure 1B:
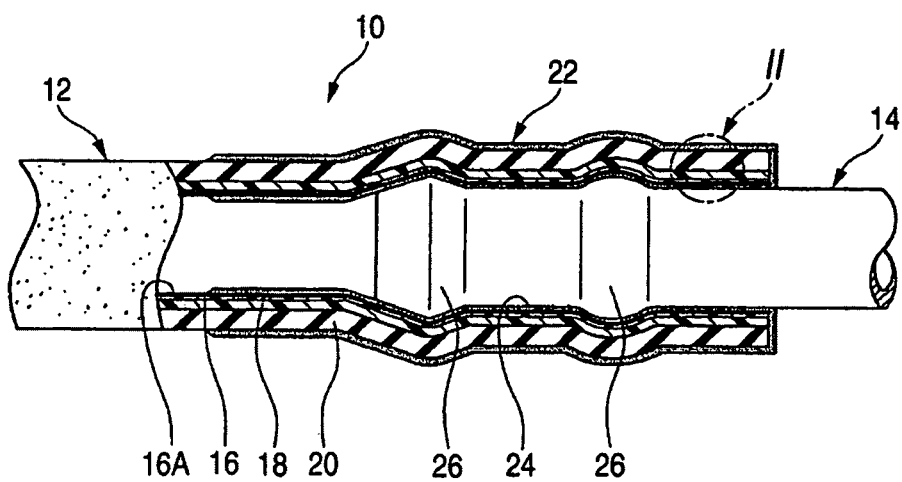

In FIG. 1A, reference numeral 10 designates a direct-connect assembly formed by fitting a hose 12, which is used for transporting automotive fuel, directly to a metal pipe 14 so that the hose 12 is integral with the metal pipe 14. FIG. 1B shows the configuration of a connecting portion between the hose 12 and the metal pipe 14, together with the cross-sectional configuration of the hose 12.

Figure 2A:
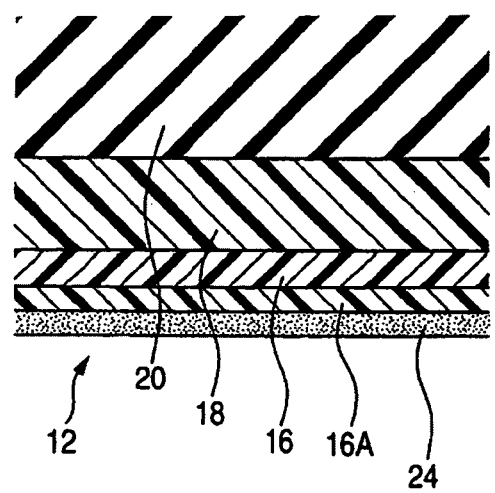
FIGS. 2A and 2B are cross-sectional views illustrating the configuration of a hose according to the embodiment of the invention.
Figure 2B:
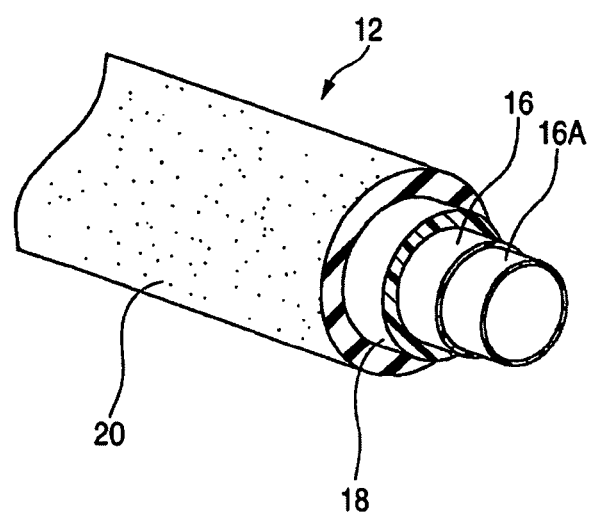

As shown in FIGS. 1B and 2, the hose 12 has a laminated structure including an innermost layer 16 made of ETFE, and also including a resin layer 18 made of PA12 and a protector 20 made of EPDM, which are provided outside the innermost layer 16.

Incidentally, an electrically conductive layer 16A is provided on the inner periphery of the innermost layer 16 made of ETFE.

Reference numeral 22 designates a connecting portion of the hose 12, at which the hose 12 is connected to the metal pipe 14. As shown in FIG. 1B, a sealing layer 24 made of a fluoro rubber material is coated on the inner surface and the outer surface of the connecting portion 22 of this embodiment, more specifically, the inner surface of the innermost layer 16 and the outer surface and the end surface of the protector 20.

Incidentally, the sealing layer 24 is securely bonded and fixed to the inner surface of the innermost layer 16.

On the other hand, the metal pipe 14 has a pair of bulged portions 26. The end part, in which the bulged portions 26 are formed, is press-fitted into the inside of the connecting portion 22 of the hose 12. Thus, the metal pipe 14 is connected directly to the connecting portion 22 of the hose 12 in a directly fitted state.

Figure 3:
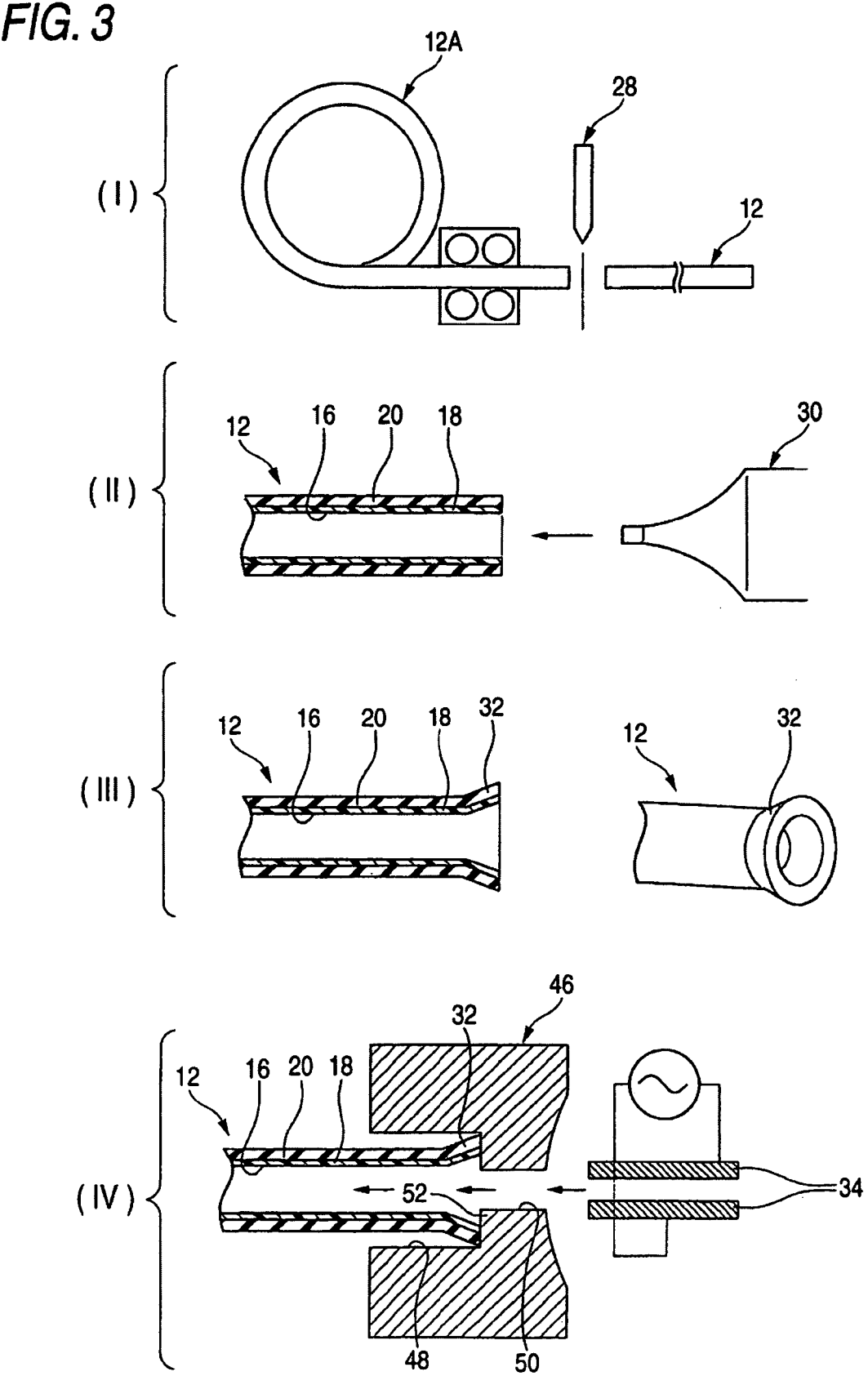
FIG. 3 (I-IV) is a view illustrating steps of a method of manufacturing an embodiment of the invention in sequence.
Figure 5:
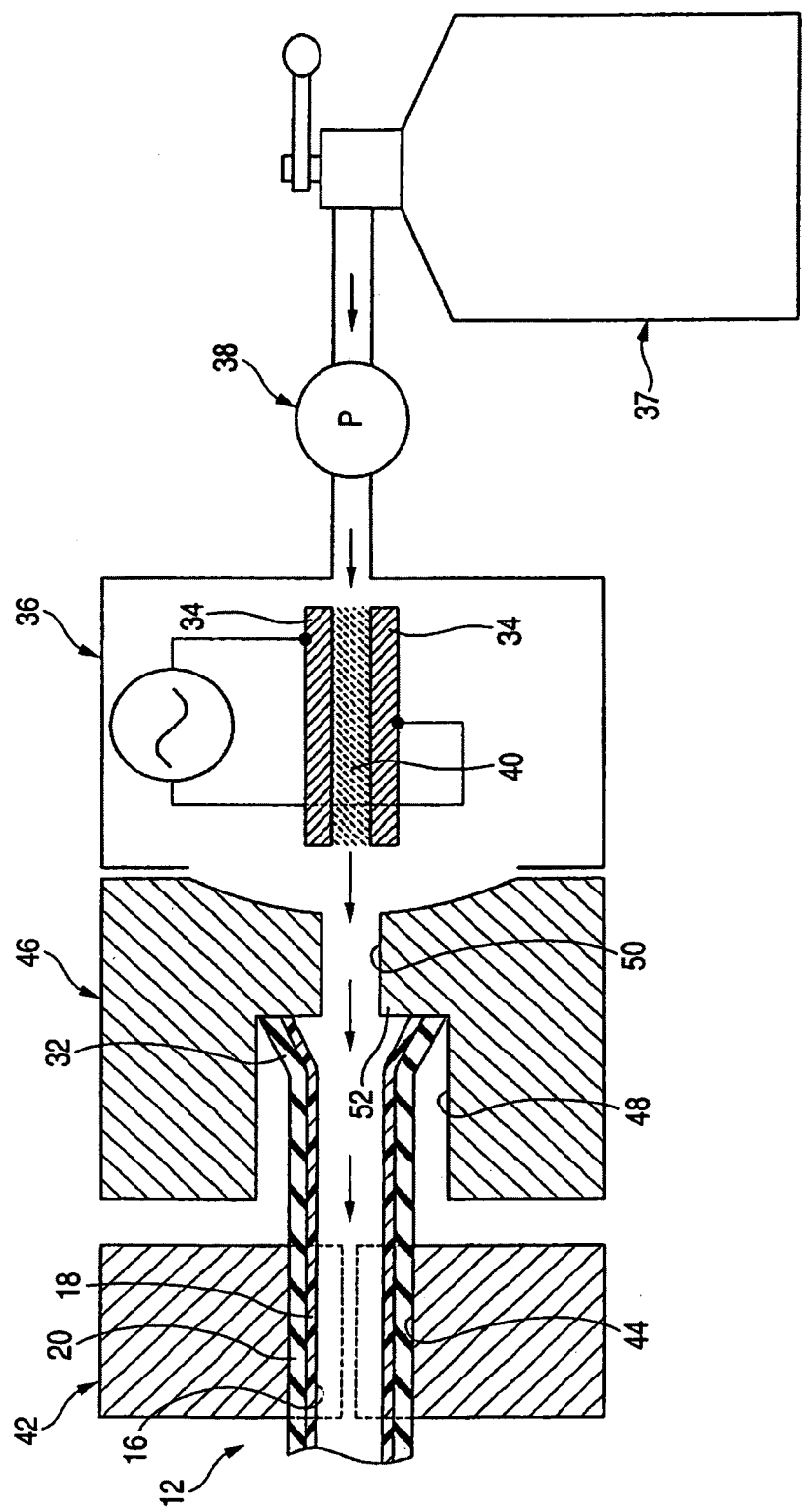
FIG. 5 is a view illustrating the details of the step (IV) illustrated in FIG. 3.

FIGS. 3 to 5 illustrate the steps of the method of manufacturing the hose 12 in sequence.

First, in the manufacturing method according to this embodiment of the invention, in step (I) shown in FIG. 3, an elongated product 12A of the hose 12, in which a laminated structure having the innermost layer 16, a resin layer 18 made of PA12 provided at an outer side thereof, and the protector 20 extends continuously, is manufactured. Then, the elongate product 12A is cut into hoses 12 in sequence by a cutter 28.

Subsequently, in step (II) shown in FIG. 3, an expanding jig 30 is pushed into an end part of the hose 12 to thereby expansion-deform the end part of the hose 12 like a horn. That is, flare processing is performed to form a flare part 32 at the end part of the hose 12 (see step (III) shown in FIG. 3).

Upon completion of the flare processing, an atmospheric plasma treatment is performed on the inner surface of the connecting portion 22 of the hose 12. The surface modification of the inner surface, more specifically, the innermost layer 16 is performed.

In step (IV) shown in FIG. 3 and also in FIG. 5, the step of the atmospheric plasma treatment is illustrated.

In FIG. 5, reference numeral 34 denotes a pair of electrodes the inside of each of which is provided in an atmospheric treatment chamber 36. The inner surface of each of the electrodes is smoothly formed. The electrodes are arranged in parallel to each other so that the smooth inner surfaces thereof are placed to maintain a constant distance therebetween.

In this treatment chamber 36, a gas (a nitrogen gas in this case), which is sent from a steel bottle 37 by a pump 38, is changed into plasma by glow discharge between the pair of electrodes 34. Reference numeral 40 designates a gas changed into plasma, that is, a plasma gas.

This plasma gas 40 is in a state in which molecules of the gas are dissociated by the glow discharge and in which various kinds of chemical species, such as ions, radicals, electrons, and molecules are contained.

Reference numeral 42 denotes a holding die that is operative to hold the hose 12 and that has a holding hole 44 at the central part thereof. The holding die 42 holds the hose 12 in a state in which the hose 12 is passed through the holding hole 44.

Figure 8A:
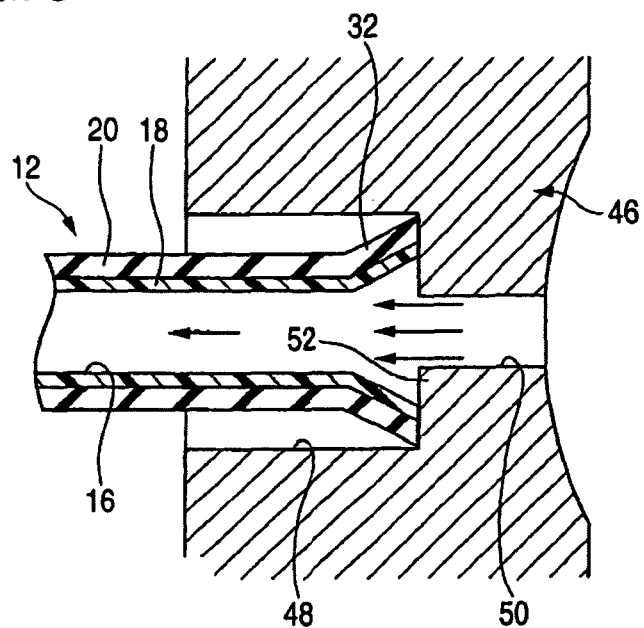
FIGS. 8A and 8B are views illustrating a primary part of another embodiment of the invention.

Reference numeral 46 designates an abutting die against which the end part of the hose 12 abuts. As illustrated in FIG. 8A, the abutting die 46 includes an insertion space 48, a gas introducing space 50 that extends continuously from the insertion space 48 and that penetrates through the die in a direction opposite to the insertion space 48, and an abutting portion 52 against which an end surface of the hose 12, more specifically, an end surface of the flare part 32 abuts.

Incidentally, the abutting portion 52 has the functions of positioning an end of the hose 12 and regulating an amount of inserted part of the hose 12, and serves as a blocking portion operative to block the plasma gas introduced through the gas introducing space 50 from going around to an outer peripheral surface of the hose 12.

Consequently, the plasma gas sent through the gas introducing space 50 can be collected to the inner peripheral side of the hose 12.

Figure 6A:
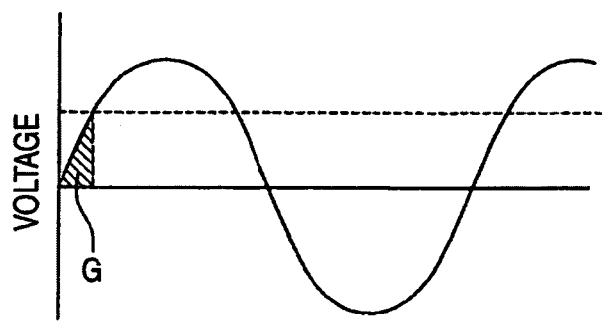
FIGS. 6A and 6B are graphs illustrating the region of the signal level region and the waveform of a voltage signal applied when a plasma treatment is performed in the step illustrated in FIG. 5.
Figure 6B:
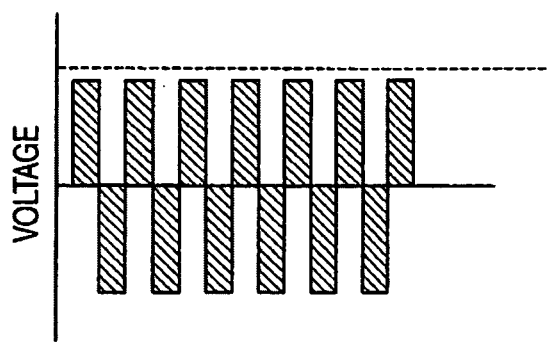
Figure 13A:
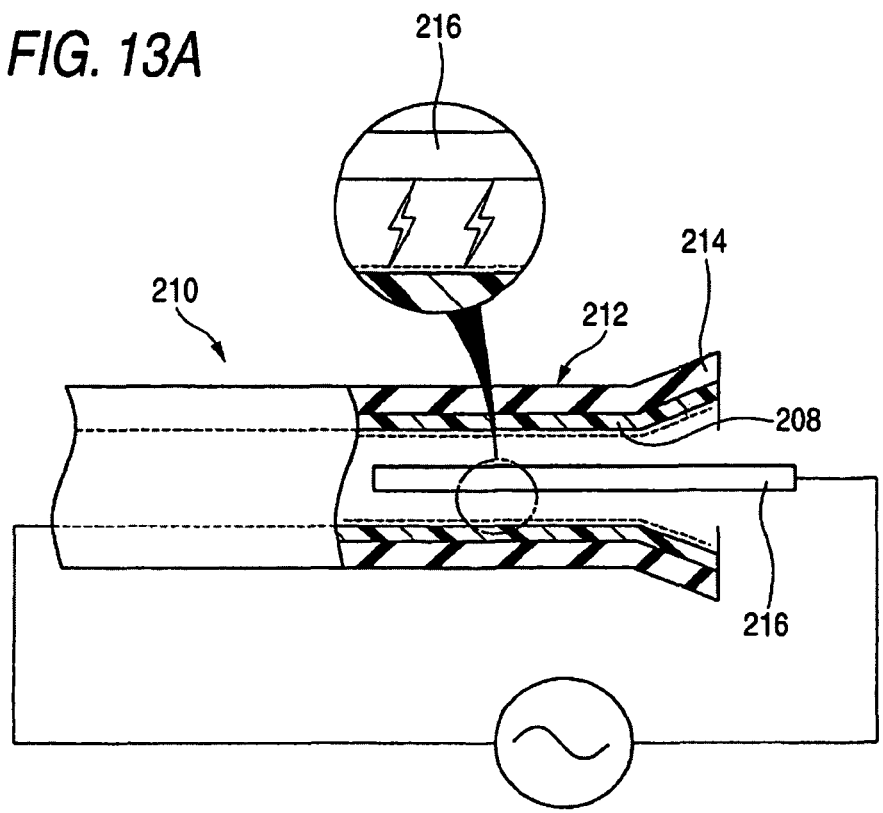
FIGS. 13A and 13B are explanatory views illustrating primary steps of the method shown in FIG. 12.
Figure 13B:
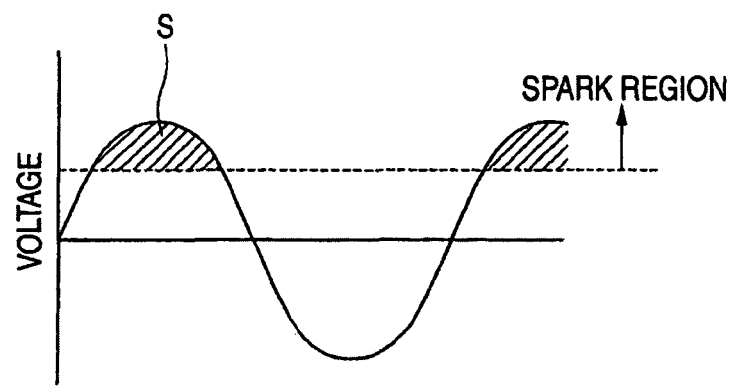

In this embodiment, a low voltage, which is in a glow discharge region indicated by reference character G shown in FIG. 6A and is equal to or less than voltages in the spark region shown in FIG. 13B, is applied like pulses. Under the presence of the gas sent from the steel bottle 37, glow discharge is caused between the pair of electrodes 34, and the gas sent from the bottle 37 is changed into a plasma gas 40.

Then, the plasma gas 40 generated between the pair of electrodes 34 is introduced to the inner surface of the hose 12 through the gas introducing space 50 of the abutting die 46, as illustrated in step (IV) shown in FIG. 3.

The inner surface of the hose 12, more specifically, the inner surface of the innermost layer 16 of the connecting portion 22 is surface-modified under the presence of oxygen and hydrogen in the air by the action of the plasma gas 40 introduced as illustrated in a schematic view of FIG. 7A. Then, functional groups including oxygen are formed therein. More specifically, functional groups, such as a carbonyl group and a hydroxyl group, which include oxygen, and the like are given to the inner surface of the innermost layer 16 by breaking down the organic bonds and reacting with oxygen and hydrogen included in the air.

Also, fine irregularities are formed on the inner surface of the innermost layer by the etching effect of the plasma gas 40.

In this embodiment, subsequently, upon completion of the plasma treatment, in step (V) shown in FIG. 4, the hose 12 is immersed in dipping liquid L obtained by diluting fluoro rubber in a solvent. Thus, the sealing layer 24 is coated on the inner surface of the innermost layer 16.

At that time, the sealing layer 24 is also coated on the outer surface and the end surface of the connecting portion 22 of the hose 12.

Subsequently, in step (VI) shown in FIG. 4, the sealing layer 24, which is thus coated, is heated for a predetermined time, and is vulcanized.

Incidentally, the sealing layer 24 made of fluoro rubber (FKM) itself performs a crosslinking reaction due to a vulcanizing agent contained therein. Simultaneously, as shown in FIG. 7B, the sealing layer 24 performs a chemical reaction with the functional group, for example, a hydroxyl group, generated in the inner surface. Thus, such a sealing layer 24 is strongly and chemically bonded to the innermost layer 16.

Also, the sealing layer 24 coated on the innermost layer 16 gets into the fine irregularities of the innermost layer 16 and is strongly physically connected to the inner surface of the innermost layer 16.

The counterpart metal pipe 14 is press-fitted into the hose 12, in which the sealing layer 24 is coated on the inner surface of the innermost layer in the aforementioned manner, in step (VII) shown in FIG. 4. Thus, the hose 12 is directly fitted into the hose 12 to form a direct-connect assembly 10 (see FIGS. 1A and 1B) in which the hose 12 and the metal pipe 14 are integral with each other.

FIGS. 8B to 9C illustrate examples of a modified abutting die 46, more specifically, examples of an abutting die 46 provided with a guide portion that leads the plasma gas 40, which is introduced through the gas introducing space 50, to an end and an inner peripheral end of the flare part 32.

Figure 8B:
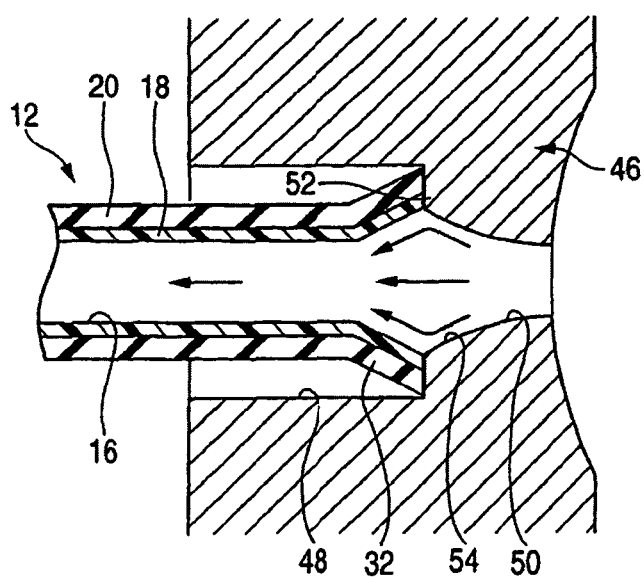

Among these examples, an abutting die shown in FIG. 8B is configured so that an expanding portion expanded like a horn is provided at an end part of the gas introducing space 50 as a guide portion 54.

In the case of forming the guide portion in this way, the inside diameter of the leftmost side part of the guide portion 54 is set to be equal to the inside diameter of the rightmost side part of the hose 12, as viewed in FIG. 8B. Consequently, the surface modification by the action of the plasma gas can be uniformly achieved to the end of the flare part 32.

Figure 9A:
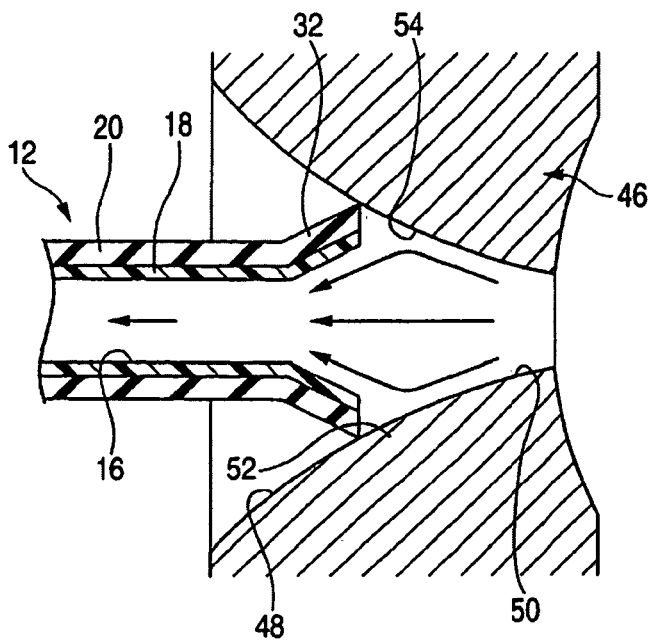
FIGS. 9A to 9C are views illustrating a primary part of still another embodiment of the invention.

An example shown in FIG. 9A is configured so that the gas introducing space 50 and the insertion space 48 are formed to extend continuously like a horn, and that a guide portion 54 is provided at an end part of the gas introducing space 50. Incidentally, in this example, an abutting portion 52 is formed to allow the outer peripheral end of the flare part 32 to abut thereagainst. The guide portion 54 leads the plasma gas to an inner peripheral end of the flare part 32.

In this example, the plasma gas is inwardly reflected by the inner peripheral surface of the end part of the guide portion 54 and is made to act upon the inner surface of the flare part 32. Thus, the surface modification of the inner surface of the flare part 32 an be achieved.

Figure 9B:
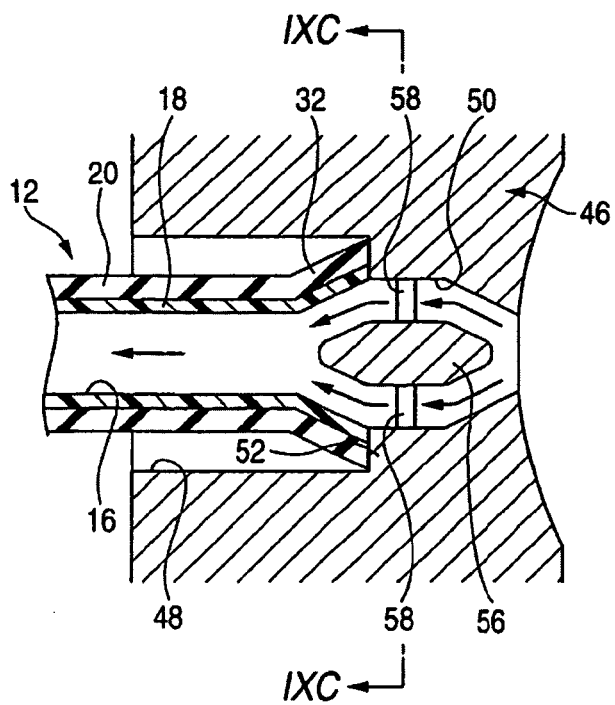
Figure 9C:
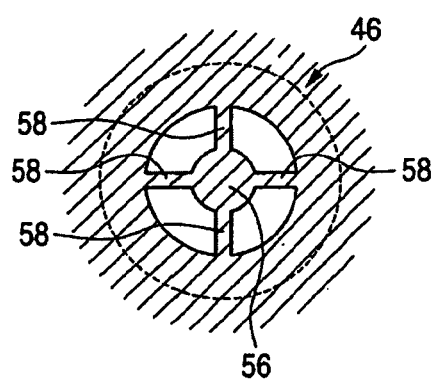

An example shown in FIGS. 9B and 9B is configured so that the gas introducing space 50 is shaped to extend to the side of the hose 12, more specifically, the space 50 is once tapered to the side of the insertion space 48 and is then extended in an axial direction of the hose 12. Also, a block-like guide portion 56, which leads the introduced plasma gas to the outer peripheral side of the gas introducing space 50, that is, to an end portion and an inner peripheral end portion of the flare part 32, is provided at a central portion of the space 50.

Incidentally, the block-like guide portion 56 is connected to the outer peripheral wall of the gas introducing space 50 and is held by connecting portions 58.

In the case of this example, the flow rate of the plasma gas at the flare part 32 is set to be equal to that of the plasma gas at each of other portions. Thus, uniform surface modification can be achieved.

The aforementioned hose 12 is configured so that after the plasma treatment is performed on the inner surface of the innermost surface 16 made of a fluororesin to thereby perform the surface modification, the sealing layer 24 made of an elastic material is coated thereon and is bonded thereto. Thus, the sealing layer 24 is bonded to the innermost layer 16 at high adhesive strength.

Therefore, when the metal pipe 14 is press-fitted into the end part of the hose 12, onto which the sealing layer 24 is coated and is bonded, the sealing layer 24 can favorably be prevented from peeling off. Consequently, the reliability of the connection between the hose 12 and the metal pipe 14 can be enhanced.

According to the embodiment, in the hose 12, which has a flare part 32 expanded like a horn provided at an end of the connecting portion 22 thereof, the flare part 32 and each of straight-shaped other portions of the connecting portion 22 are substantially uniformly modified so that the adhesive strength between the sealing layer and each of the flare part and the straight-shaped other portions is set at equal strength. Thus, this embodiment has an advantage in that when the metal pipe 14 is press-fitted thereinto, not only the straight-shaped portions but the flare part 32 does not peel off.

According to the embodiment, the metal pipe 14 is directly press-fitted into the hose 12 in a state in which the metal pipe is fitted into the hose, to thereby form a direct-connect assembly 10 in which the hose 12 and the metal pipe 14 are integral with each other. Thus, the step of assembling the metal pipe 14 to the hose 12 in an assembling process performed on an automotive assembly line can be omitted. Consequently, the number of steps of the assembling process can be reduced. Also, the number of components needed for assembly of an automobile can be reduced.

According to the embodiment, when a hose 12 having a flare part 32 expanded like a horn, which is provided at an end thereof, is manufactured, the guide portion 54 or 56 operative to lead the plasma gas 40 to an end and an inner peripheral end of the flare part is provided in the abutting die 46. Thus, the plasma gas 40 is made to flow from the end and the inner peripheral end of the flare portion into the inside of the innermost layer 16. Consequently, the plasma gas 40 can be made to uniformly act upon the inner surface of the flare part 32 and upon the inner surface of each of straight-shaped other portions. Thus, the inner surfaces thereof are substantially uniformly surface-modified.

Consequently, the adhesive strength between the sealing layer 24 and each of the flare part 32 and the straight-shaped other portions can be set at high and equal strength.

As described in TABLE 1, the adhesive strength of the formed sealing layer was evaluated by conducting the following two kinds of tests on hoses whose innermost layers were respectively subjected to an atmospheric plasma treatment, a vacuum plasma treatment, a corona treatment, a primer treatment, and no treatment before the coating of the sealing layer 24.

Pencil Hardness Test

After the coating of the sealing layer 24, the hoses 12 were cut open. The adhesive strength of the sealing layer provided on the inner surface of each of the hoses 12 was evaluated by conducting a pencil hardness test according to a coating hardness test method pursuant to JIS K 5400.

Figure 10A:
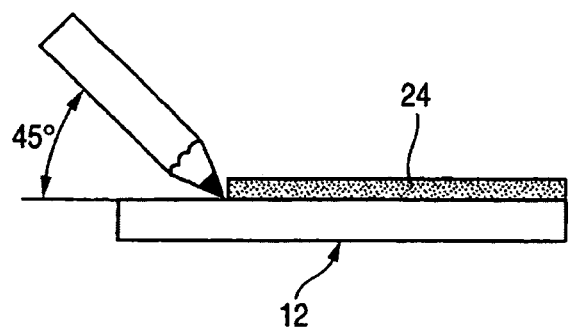
FIGS. 10A and 10B are explanatory views illustrating a method of evaluating adhesive strength in the embodiments of the invention.

Incidentally, the surface of the sealing layer 24 was scratched by a pencil lead, as illustrated in FIG. 10A, so as to prevent results of the evaluation from depending upon the hardness of the sealing layer 24 itself. The strength of each of the sealing layers 24 was evaluated according to whether or not the sealing layer 24 was peeled off.

According to this test method, in a case where the sealing layer 24 was not peeled off even when the hardness of the pencil lead was increased, the adhesive strength of the sealing layer 24 was higher for that.

Peeling Test at Press-Fitting of Metal Pipe into Hose

Figure 10B:
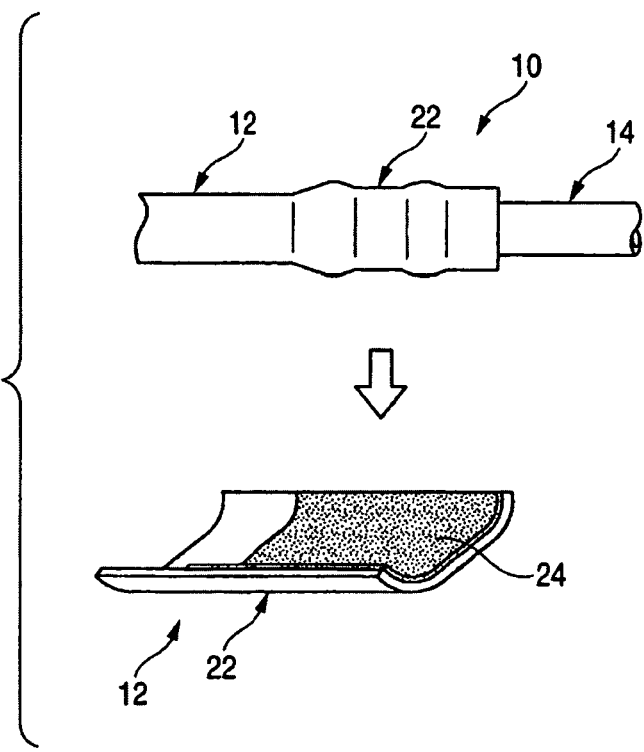
Figure 11:
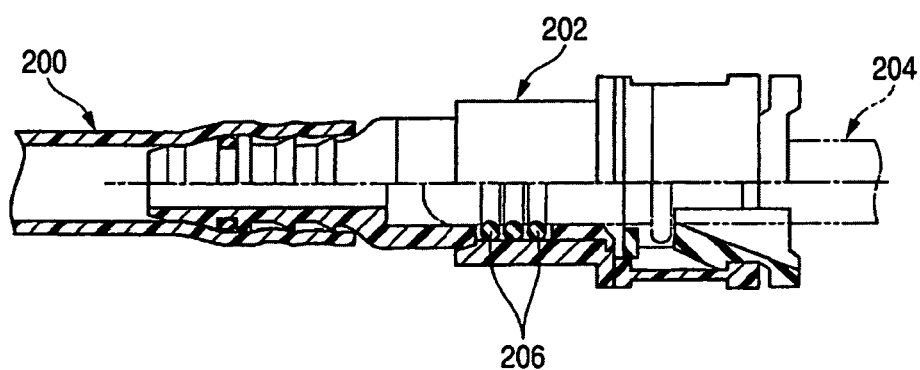
FIG. 11 is a view illustrating a related method of connecting a hose and a metal pipe.
Figure 12:
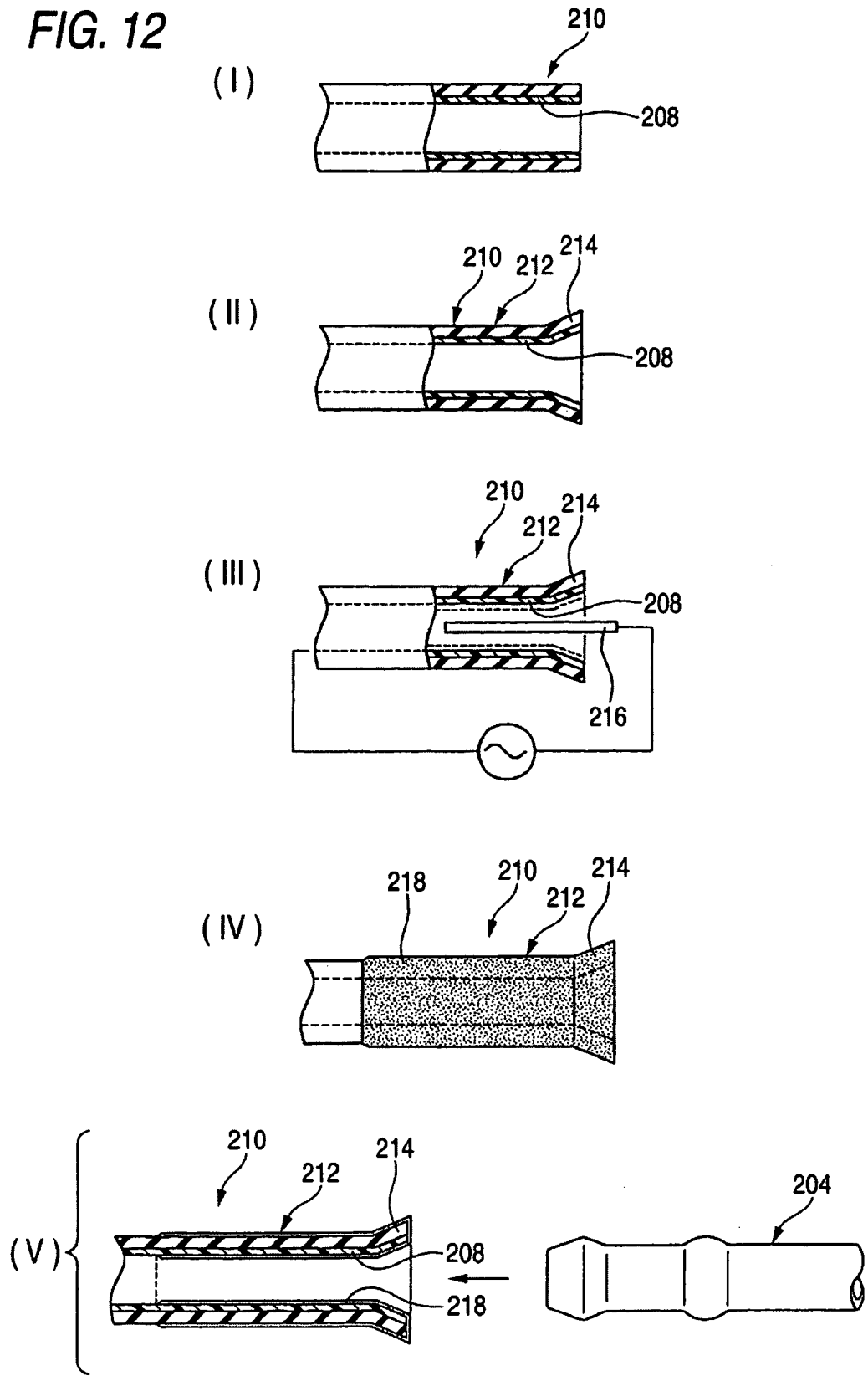
FIG. 12 (I-V) is an explanatory view illustrating steps of a surface modification method tried by the inventors of the invention, which utilizes a corona treatment, in sequence.

An end portion of the metal pipe 14 is press-fitted into the hose 12, as shown in FIG. 10B. Thereafter, the hose 12 was cut open. The state of the inner surface thereof was observed so as to check whether or not the sealing layer 24 was peeled off.

In TABLE 1, the expression "primer treatment" means the dipping coating of the innermost layer with F-primer that is a coupling agent manufactured by FLON INDUSTRY Co., LTD.

In TABLE 1, the expression "atmospheric plasma treatment 1" designates an atmospheric plasma treatment performed by using an abutting die 46 shown in FIGS. 5 and 8A. The expression "atmospheric plasma treatment 2" designates an atmospheric plasma treatment performed by using an improved abutting die 46 shown in FIGS. 8B to 9C.

The expression "vacuum plasma treatment" designates a plasma treatment performed in a vacuum chamber.

Results of the evaluation are shown together in TABLE 1.

TABLE 1

| | | | Results of Evaluation | | |
| | | Specifications of Evaluated | Pencil Hardness Test | | Peeling at Press-fitting |
| Method of Treatment | Treatment Condition | Hose (Innermost Layer) | Flare Portion | Straight Portion | of Metal Pipe into Hose |
|---|---|---|---|---|---|
| No Treatment | — | con-ETFE Material | H x | H x | Whole Area of Press-fitted Part Was Peeled |
| | | TPEE Material | ↑ | ↑ | ↑ |
| | | Modified PBT Material | ↑ | ↑ | ↑ |
| | | PPS Material | ↑ | ↑ | ↑ |
| Primer Treatment | Dipping Coating with Primer Agenet | con-ETFE Material | ↑ | ↑ | ↑ |

TABLE 1-continued

| Method of Treatment | Treatment Condition | Specifications of Evaluated Hose (Innermost Layer) | Pencil Hardness Test Flare Portion | Straight Portion | Peeling at Press-fitting of Metal Pipe into Hose |
|---|---|---|---|---|---|
| Atmospheric Plasma Treatment 1 | N₂ Gas, 154 W × 10 Seconds | ↑ | 2H O | 6H O | Whole Area OK |
| Atmospheric Plasma Treatment 2 | N₂ Gas, 154 W × 10 Seconds | ↑ | 6H O | 6H O | Whole Area OK |
| | | TPEE Material | ↑ | ↑ | ↑ |
| | | Modified PBT Material | ↑ | ↑ | ↑ |
| | | PPS Material | ↑ | ↑ | ↑ |
| Vacuum Plasma Treatment | Ar Gas, 100 W × 60 Seconds | con-ETFE Material | ↑ | ↑ | ↑ |
| Corona Treatment | 65 W × 10 Seconds | ↑ | H x | ↑ | Only Flare Portion was Peeled |

W: Output

In the hoses described in TABLE 1, the resins used as the materials of the innermost layers are ETFE, TPEE, PBT, PPS, PE, and PP. However, a hose according to the invention may be configured by either a single layer made of such a material or a multi-layer structure described below (in the following description, each of the expressions corresponding to multi-layer tubes represents the materials of the innermost layer to the outermost layer of the corresponding multilayer structure from left to right.

In any of hoses according to the invention, it is the resin material of the innermost layer that matters. Results of the evaluation do not depend upon the other constituents of the hose.

Two-layer Tube ETFE/PA12

Three-Layer Tube conETFE/ETFE/PA12, TPEE/PBN/TPEE, modified-PBT/PBT/TPEE, PPS/Ad/PA12

Four-Layer Tube conETFE/PA6/Ad/PA12, conETFE/PA12/PPS/PA12, conPPS/PPS/Ad/PA12

Five-Layer Tube conPBT/modified-PBT/PBN/modified-PBT/TPEE, ETFE/Ad/PPS/Ad/PA12

Incidentally,
con: an abbreviation for "conductive",
ETFE: an ethylene-tetrafluoroethylene copolymer,
TPEE: a thermoplastic polyester elastomer,
PBT: polybutylene terephthalate,
PPS: polyphenylenesulfide,
PE: polyethylene,
PP: polypropylene,
PA: polyamide,
PBN: polybutylene naphthalate,
Ad: an abbreviation for "Adhesive agent".

The results shown in TABLE 1 reveal that the atmospheric plasma treatment performed on the innermost layer 16 of the hose 12 enables the sealing layer 24 to favorably adhere to the flare part 32 of the connecting portion 22 of the hose 12 and to straight-shaped other portions. Especially, the atmospheric plasma treatment using the improved abutting die 46 enables the uniform surface modification of the inner surface of the innermost layer 16 and the straight-shaped other portions, so that the sealing layer 24 adheres thereto at equal adhesive strength.

Incidentally, in the case of performing the corona treatment on the innermost layer 16, the sealing layer 24 exerts good adhesive strength on the straight-shaped portions. However, the hose, whose innermost layer is subjected to the corona treatment, has inherent problems that sparks are generated by a discharge treatment as described above, that local melting occurs in the innermost layer 16, and that holes are sometimes generated in the innermost layer 16.

While the aforementioned embodiments of the invention are for illustrative purpose only, it should be understood that the invention is not limited thereto. The invention may be embodied with various changes and modifications and may be realized in various manners without departing from the spirit and scope of the invention.

What is claimed is:

1. A method of manufacturing a hose, including a connecting portion on an end part of the hose, a resin layer as an inner layer of the hose and a sealing layer of an elastic material, the method comprising:
generating a plasma gas outside the hose, by glow discharge between a pair of electrodes;
performing an atmospheric plasma treatment by sending the plasma gas generated outside the hose to an inner surface of the inner layer of the connecting portion to modify the inner surface by action of the plasma gas; and
coating the sealing layer on the inner surface to bond the sealing layer to the inner surface,
wherein, in sending the plasma gas, an abutting member is used, against which the end part of the hose abuts, the abutting member having an insertion portion into which the end part of the hose is inserted through an opening end of the insertion portion, a gas introducing portion extending from an end of the insertion portion opposite from the opening end and penetrating through the abutting member, and a blocking portion provided at a position between the insertion portion and the gas introducing portion and configured to block the plasma gas introduced through the gas introducing portion from passing to an outer surface of the hose, a cross-section area of the insertion portion being larger than a cross-section area of the gas introducing portion and larger than a cross-section area of the hose, the insertion portion, the gas introducing portion and the blocking portion comprising a single integrated structure, wherein the plasma gas being introduced into the gas introducing portion of the abutting member, is introduced to the inner surface of the inner layer of the connecting portion through the gas introducing portion, to perform the atmospheric plasma treatment, and wherein the sending the plasma gas comprises:

inserting the end part of the hose into the insertion portion through the opening end of the insertion portion in a direction opposite to a direction in which the plasma gas is introduced to the inner surface; and abutting the end part of the hose against the blocking portion of the abutting member, such that the inner surface of the tube communicates with the gas introducing portion and the outer surface of the hose does not communicate with the gas introducing portion due to contact of the blocking portion with the hose.

2. The method of manufacturing a hose according to claim 1, wherein in generating the plasma gas outside the hose, the glow discharge is performed between the pair of electrodes that are positioned on an opposite side of the gas introducing portion of the abutting member from the opening end of the insertion portion.

3. The method of manufacturing a hose according to claim 2, wherein the pair of electrodes are positioned in an atmospheric treatment chamber that is provided on the opposite side of the gas introducing portion of the abutting member from the opening end of the insertion portion, and communicates with the gas introducing portion and a gas source, the method further comprises sending a gas from the gas source to the gas introducing portion via the atmospheric treatment chamber, and when the gas sent from the gas source passes between the pair of electrodes in the atmospheric treatment chamber, the glow discharge is performed to change the gas sent from the gas source into the plasma gas.

4. The method of manufacturing a hose according to claim 1, wherein an inner diameter of the gas introducing portion in its entire length is smaller than an inner diameter of the hose.

5. The method of manufacturing a hose according to claim 1, wherein the abutting member includes a curved portion around an end of the gas introducing portion to which the plasma gas is introduced.

6. A method of manufacturing a hose, including a connecting portion on an end part of the hose, a resin layer as an inner layer of the hose and a sealing layer of an elastic material, the connecting portion including a straight part having a predetermined cross-section area and a flare part, a cross-section area of which increases toward an end of the flare part, the method comprising:

generating a plasma gas outside the hose, by glow discharge between a pair of electrodes;

performing an atmospheric plasma treatment by sending the plasma gas generated outside the hose to an inner surface of the inner layer of the connecting portion to modify the inner surface by action of the plasma gas; and coating the sealing layer on the inner surface to bond the sealing layer to the inner surface, wherein, in sending the plasma gas, an abutting member is used, against which the end of the flare part abuts, the abutting member having an insertion portion into which the end part of the hose is inserted through an opening end of the insertion portion, a gas introducing portion extending from an end of the insertion portion opposite from the opening end and penetrating through the abutting member, a blocking portion provided at a position between the insertion portion and the gas introducing portion and configured to block the plasma gas introduced through the gas introducing portion from passing to an outer surface of the hose, and a guide portion configured to direct the plasma gas flowing in the gas introducing portion to the end of the flare part, a cross-section area of the insertion portion being larger than a cross-section area of the gas introducing portion and larger than the cross-section area of the straight part of the hose, the insertion portion, the gas introducing portion and the blocking portion comprising a single integrated structure;

wherein the plasma gas being introduced into the gas introducing portion of the abutting member, is introduced to the inner surface of the inner layer of the hose through the gas introducing portion and guided by the guide portion to modify the inner surface by action of the plasma gas, to perform the atmospheric plasma treatment, such that the flare part and the straight part of the connecting portion are uniformly modified;

wherein the guide portion causes the plasma gas to flow from the end of the flare part to the inner surface of the inner layer; and wherein the sending the plasma gas comprises:

inserting the end part of the hose into the insertion portion through the opening end of the insertion portion in a direction opposite to a direction in which the plasma gas is introduced to the inner surface; and abutting the end of the flare part against the blocking portion of the abutting member, such that the inner surface of the tube communicates with the gas introducing portion and the outer surface of the hose does not communicate with the gas introducing portion due to contact of the blocking portion with the flare part of the hose.

7. The method of manufacturing a hose according to claim 6, wherein the guide portion of the abutting member comprises a tapered portion such that an inner diameter of the gas introducing portion increases from an end to which the plasma gas is introduced to another end from which the plasma gas is discharged into the connection portion.

8. The method of manufacturing a hose according to claim 7, wherein the guide portion of the abutting member further comprises a block provided generally at the center of the gas introducing portion to direct the plasma gas introduced into the gas introducing portion to an outer peripheral side of the gas introducing portion.

9. The method of manufacturing a hose according to claim 7, wherein the flare part abuts the abutting member such that an inner diameter of an opening of the hose at the end of the flare part generally coincides with the inner diameter of the gas introducing portion at the end from which the plasma gas is discharged into the connection portion.

10. The method of manufacturing a hose according to claim 6, wherein in generating the plasma gas outside the hose, the glow discharge is performed between the pair of electrodes that are positioned on an opposite side of the gas introducing portion of the abutting member from the opening end of the insertion portion.

11. The method of manufacturing a hose according to claim 10, wherein the pair of electrodes are positioned in an atmospheric treatment chamber that is provided on the opposite side of the gas introducing portion of the abutting member from the opening end of the insertion portion, and communicates with the gas introducing portion and a gas source, the method further comprises sending a gas from the gas source to the gas introducing portion via the atmospheric treatment chamber, and when the gas sent from the gas source passes between the pair of electrodes in the atmospheric treatment chamber, the glow discharge is performed to change the gas sent from the gas source into the plasma gas.

12. The method of manufacturing a hose according to claim 6, wherein an inner diameter of the gas introducing portion in its entire length is smaller than an inner diameter of the hose.

13. The method of manufacturing a hose according to claim 6, wherein the abutting member includes a curved portion around an end of the gas introducing portion to which the plasma gas is introduced.

14. The method of manufacturing a hose according to claim 6, an outer diameter of the end of the flare part is substantially the same as an inner diameter of the insertion portion of the abutting member.

15. The method of manufacturing a hose according to claim 6, wherein, further comprising: inserting the hose into a holding hole provided in a holding member, to hold the hose by the holding member,
   wherein the hose is inserted into the insertion portion of the abutting member, while the holding member holds the hose.

16. The method of manufacturing a hose according to claim 6, wherein
   the abutting member includes a curved portion around an end of the gas introducing portion to which the plasma gas is introduced, and
an outer diameter of the end of the flare part is substantially the same as an inner diameter of the insertion portion of the abutting member.

* * * * *